RING COUNTER

Filed March 29, 1956 3 Sheets-Sheet 1

INVENTORS
A. J. PANKRATZ
LOTHAR M. SCHMIDT
BY Theodore H. Lassagne
ATTORNEY

Aug. 5, 1958 A. J. PANKRATZ ET Al 2,846,594

RING COUNTER

Filed March 29, 1956 3 Sheets-Sheet 2

INVENTORS
A. J. PANKRATZ
BY LOTHAR M. SCHMIDT
ATTORNEY

RING COUNTER

Filed March 29, 1956 3 Sheets-Sheet 3

INVENTORS
A. J. PANKRATZ
LOTHAR M. SCHMIDT
BY Theodore H. Lassagne
ATTORNEY

United States Patent Office 2,846,594
Patented Aug. 5, 1958

2,846,594

RING COUNTER

A. J. Pankratz and Lothar M. Schmidt, Glendale, Calif., assignors to Librascope, Incorporated, Glendale, Calif., a corporation of California Application March 29, 1956, Serial No. 574,657

9 Claims. (Cl. 307—88.5)

This invention relates to counters, and more particularly to ring counters which use transistors directly coupled to one another to provide a count at any instant of the number of signals introduced into the counters.

With the development of digital computers and data processing systems, circuits for counting serially occurring electrical signals have become very important. The counters generally use bistable members such as flip-flops to provide a count of the number of signals introduced into the counter. Some of the counters operate on a binary basis in which successive flip-flops provide indications of digits such as 1, 2, 4, 8, 16, etc. Any digital number can be indicated by various patterns of operation of the different flip-flops. However, binary counters have been found disadvantageous because they require complicated gating circuits and relatively large numbers of diodes to control the proper triggering of the different flip-flops in the counter upon the introduction of successive signals to the counter.

Other counters have been formed from a plurality of flip-flops connected in a ring. A ring counter is advantageous since the gating circuits controlling the triggering of the different flip-flops in the counter can be less complicated than the gating circuits in a binary counter. However, ring counters are disadvantageous in that they require the use of one flip-flop per stage. For example, eight flip-flops would be required in a ring counter to count on a digital basis from "0" to "7," inclusive, whereas only three flip-flops would be required in a binary counter.

This invention provides a ring counter which requires a relatively few number of components to provide an indication as to the number of signals introduced to the counter. The ring counter embodying this invention is advantageous in that it uses transistors which are directly coupled to one another. Transistors are advantageous because they are small, have low power dissipation and have relatively stable operating characteristics over long periods of time. The direct coupling of transistors offers further advantages since the elements of each transistor can be directly connected to the elements of other transistors without the inclusion of any intermediate impedances such as resistances. This not only tends to reduce the number of components but also tends to minimize power losses.

Means are associated with the ring counter of this invention to produce first and second triggering signals on an alternate basis. The first triggering signals are introduced to alternate flip-flops in the counter and the second triggering signals are introduced to the other flip-flops in the counter. Each flip-flop also has signals introduced to it from the preceding flip-flop so as to become triggered to a first state of operation only upon the occurrence of the first state of operation in the preceding flip-flop and the simultaneous introduction of a triggering signal to the flip-flop. Each flip-flop becomes triggered to its second state of operation when the next flip-flop becomes triggered to its first state of operation. The controls imposed to trigger each flip-flop into its first and second states of operation can be obtained by the use of transistors connected in simple logical circuitry. In this way, a ring counter man be produced which operates reliably with a minimum number of components.

Figure 1:
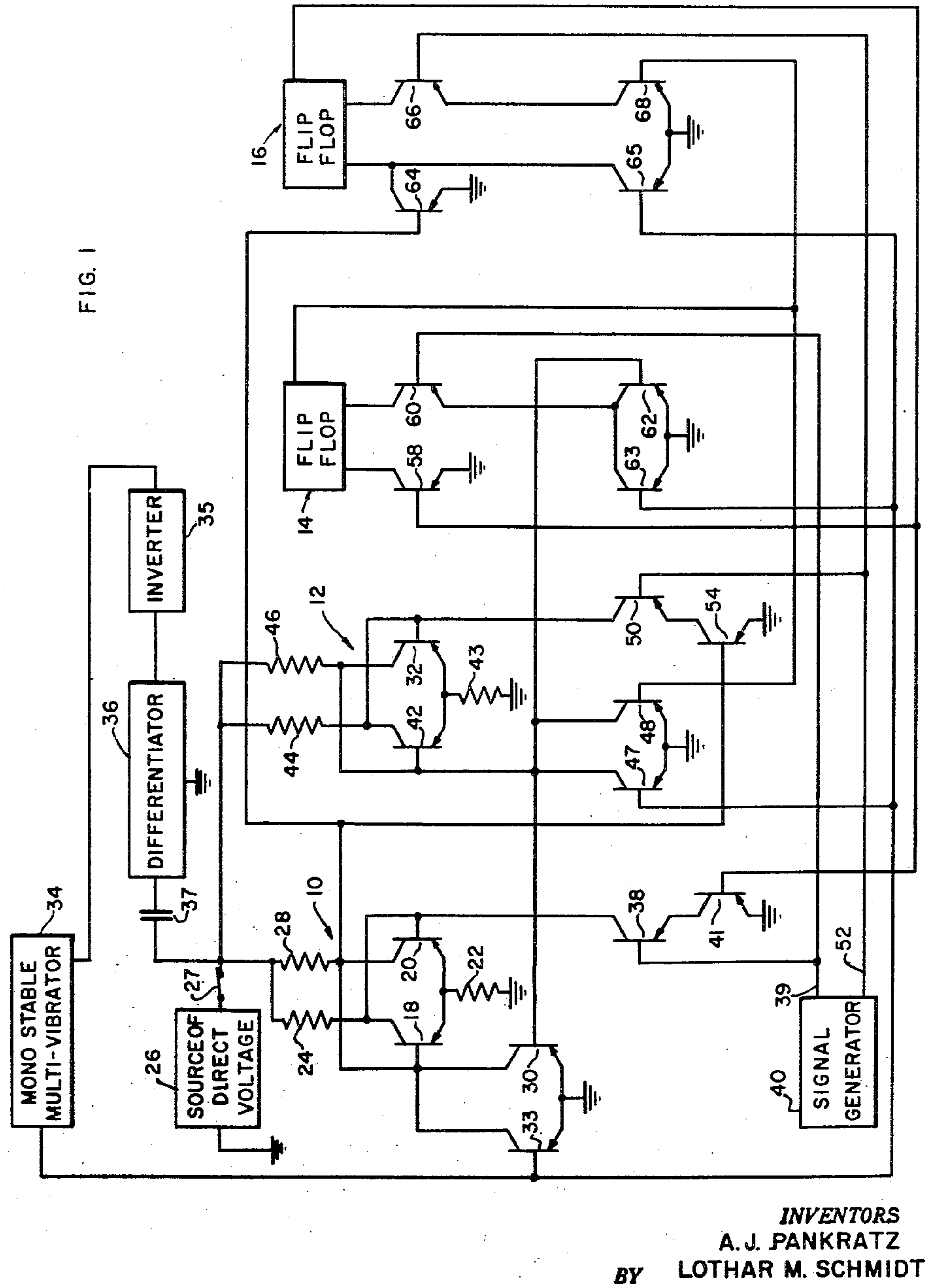
Figure 1 is a circuit diagram, partly in block form, illustrating the electrical construction of a ring counter constituting one embodiment of the invention.

In the embodiment of the invention shown in the drawings a plurality of flip-flops generally indicated at 10, 12, 14 and 16 are connected to one another to operate as a ring counter. The flip-flop 10 includes a pair of semi-conductors such as transistors 18 and 20. Each of the transistors 18 and 20 is provided with elements corresponding to or equivalent to a collector, an emitter and a base. The base of each collector is formed from a piece of germanium having a pair of parallel faces separated from each other by a relatively short distance. Certain materials such as gallium or a mixture of gallium and indium are coated on each of the faces of the germanium base to form the elements equivalent to the emitter and collector of the transistor. One suitable type of transistor which may be used is the surface barrier transistor manufactured by the Philco Corporation.

The emitters of the transistors 18 and 20 are connected to one terminal of a resistance 22 having its other terminal grounded. The resistance 22 may have a value in the order of 0 to 200 ohms. Voltage is applied to the collector of the transistor 18 through a resistance 24 from a source 26 of direct voltage. The resistance 24 may have a value of approximately 1,000 ohms and the potential from the source 26 may have a negative polarity and a magnitude in the order of 1½ volts. A manually operated switch 27 may be connected between the voltage source 26 and the resistance 28. In like manner, voltage is applied from the source 26 to the collector of the transistor 20 through a resistance 28 having a value corresponding to that of the resistance 24.

The base of the transistor 18 is connected to the collector of the transistor 20 and to the collector of a transistor 30 having properties similar to the transistor 18. The emitter of the transistor 30 is grounded and the base of the transistor 30 is connected to receive the potential on the collector of a transistor 32 forming a part of the flip-flop 12. A connection is also made from the base of the transistor 18 to the collector of a transistor 33 having its emitter grounded. The base of the transistor 33 is adapted to receive the voltage from one of the output terminals in a monostable multivibrator 34. The monostable multivibrator 34 may include a pair of transistors corresponding to the transistors 18 and 20. The base of the transistor 33 is connected to the collector of one of the transistors in the multivibrator 34, this collector being hereinafter designated as the "left" output terminal of the multivibrator.

The base of the other transistor in the multivibrator 34 may be designated as the right input terminal of the multivibrator. This input terminal is connected to the output terminal of an inverter 35. The input terminal of the inverter 35 is adapted to receive signals from a differentiator 36. A capacitance 37 is connected between the input terminal of the differentiator 36 and the stationary contact of the switch 27.

In like manner, the base of the transistor 20 has voltages applied to it from the collector of the transistor 18 and from the collector of a transistor 38. Signals are applied to the base of the transistor 38 through a line 39 from a generator 40. The emitter of the transistor 38 and the collector of a transistor 41 have common terminals. The emitter of the transistor 41 is grounded and the base of the transistor 41 is connected to an output terminal of the flip-flop 16 corresponding to the collector of the transistor 20 in the flip-flop 10.

The flip-flop 12 is constructed in a manner similar to the flip-flop 10. It includes the transistor 32 and a transistor 42, the emitters of which are connected to the ungrounded terminal of a resistance 43 having a value corresponding to that of the resistance 22. The collectors of the transistors 32 and 42 respectively having voltages applied to them from the source 26 through resistances 44 and 46 having values corresponding to the resistance 24. The base of each of the transistors 32 and 42 is connected to the collector of the other transistor.

In addition to receiving voltage from the collector of the transistor 32, the base of the transistor 42 has voltage applied to it from the collectors of transistors 47 and 48. The emitters of the transistors 47 and 48 are grounded. A connection is made from the base of the transistor 47 to the left output terminal of the multivibrator 34. The base of the transistor 48 is connected to the output terminal of the flip-flop 14 corresponding to the collector of the transistor 20 in the flip-flop 10.

The base of the transistor 32 receives voltages from the collector of a transistor 50 as well as from the collector of the transistor 42. Signals are applied to the base of the transistor 50 through a line 52 from a second terminal in the signal generator 40. The emitter of the transistor 50 has a common connection with the collector of a transistor 54, the emitter of which is grounded. The base of the transistor 54 is connected to the collector of the transistor 20.

Although the flip-flop 14 is shown in block form in Figure 1, it should be appreciated that it may be constructed in a manner similar to that described above and shown in the drawings for the flip-flops 10 and 12. One input terminal of the flip-flop 14 corresponds to the base of the transistor 18 in the flip-flop 10. This input terminal will hereafter be designated as the "left" input terminal of the flip-flop 14. This input terminal is connected to the collector of a transistor 58 having its emitter grounded. The base of the transistor 58 receives the voltage on the output terminal of the flip-flop 16 corresponding to the collector of the transistor 20 in the flip-flop 10. This output terminal will be hereafter designated as the "right" output terminal of the flip-flop 16.

The second input terminal of the flip-flop 14 corresponds to the base of the transistor 20 in the flip-flop 10. This input terminal will hereafter be designated as the "right" input terminal of the flip-flop 14. The right input terminal of the flip-flop 14 receives the voltage on the collector of a transistor 60. The base of the transistor 60 is connected through the line 39 to the signal generator 40 to receive the triggering signals introduced to the line. The emitter of the transistor 60 has a common connection with the collectors of transistors 62 and 63, the emitters of which are grounded. A connection is made from the base of the transistor 62 to the collector of the transistor 32. The base of the transistor 63 has a common connection with the left output terminal of the multivibrator 34.

The flip-flop 16 is provided with a pair of input terminals corresponding to the input terminals in the flip-flop 14. These input terminals will hereafter be designated as the "left" and the "right" input terminals of the flip-flop 16. The left input terminal of the flip-flop 16 has voltage applied to it from the collectors of a pair of transistors 64 and 65 having their emitters grounded. The base of the transistor 65 is connected to the left output terminal of the multivibrator 34 and the base of the transistor 64 is connected to the collector of the transistor 20.

Voltage is applied to the right input terminal of the flip-flop 16 from the collector of a transistor 66. The base of the transistor 66 is connected through the line 52 to the signal generator 40 to receive the signals introduced to the line. A connection is made from the emitter of the transistor 66 to the collector of a transistor 68 having its emitter grounded. The base of the transistor 68 is connected to the right output terminal of the flip-flop 14.

Figure 2:
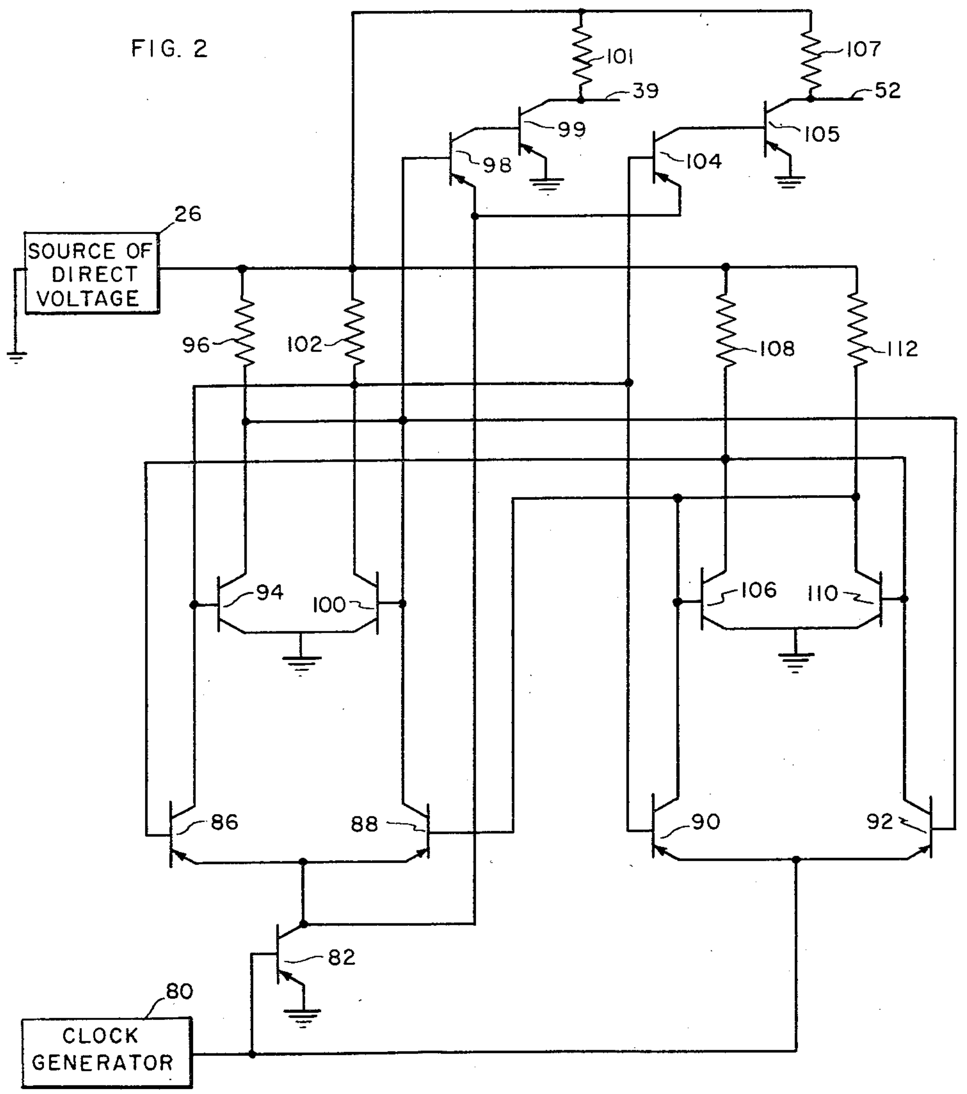
Figure 2 is a circuit diagram partly in block form illustrating the construction of a signal generator suitable for use in the ring counter shown in Figure 1.

The signal generator 40 may be constructed in various ways. One way of constructing the signal generator 40 is shown in Figure 2. The circuitry shown in Figure 2 includes a clock generator 80 adapted to provide cyclic clock signals. The clock generator 80 may be a relaxation oscillator or the clock channel in a digital computer, or it may have a variety of other forms. The output signals from the clock generator 80 are applied to the base of a transistor 82 and to the emitters of transistors 90 and 92. The emitter of the transistor 82 is grounded and the collector of the transistor 82 is connected to the emitters of transistors 86 and 88.

The collector of the transistor 86 has a common connection with the base of a transistor 94, the emitter of which is grounded. A resistance 96 is connected between the collector of the transistor 94 and the negative terminal of the voltage source 26. The voltage on the collector of the transistor 94 is applied to the base of a transistor 98 having its emitter connected to the collector of the transistor 82. The output signals from the collector of the transistor 98 are introduced to the base of a transistor 99 having its emitter grounded. The collector of the transistor 99 is connected to the line 39 in Figure 1 and to one terminal of a resistance 101, the other terminal of which is connected to the negative terminal of the voltage source 26.

A connection is made from the collector of the transistor 88 to the base of the transistor 100, the emitter of which is grounded. A resistance 102 is connected between the collector of the transistor 100 and the negative terminal of the voltage source 26. The voltage on the collector of the transistor 100 is applied to the base of a transistor 104, the emitter of which has a common terminal with the collector of the transistor 82. The signals on the collector of the transistor 104 pass to the base of a transistor 105, the emitter of which is grounded. The signals on the collector of the transistor 105 are introduced to the line 52 in Figure 1. A resistance 107 is connected between the collector of the transistor 105 and the negative terminal of the voltage source 26.

In addition to being applied to the base of the transistor 104, the voltage on the collector of the transistor 100 is introduced to the bases of the transistors 90 and 94. A connection is made from the collector of the transistor 90 to the base of a transistor 106 having its emitter grounded. A resistance 108 is connected between the collector of the transistor 106 and the negative terminal of the voltage source 26. The collector of the transistor 106 also has a common connection with the base of the transistor 86 and with the base of a transistor 110.

In like manner, the voltage on the collector of the transistor 94 is applied to the bases of the transistors 92 and 100 as well as to the base of the transistor 98. A connection is made from the collector of the transistor 92 to the base of a transistor 110, the emitter of which is grounded. A resistance 112 is connected between the collector of the transistor 110 and the negative terminal of the voltage source 26. The collector of the transistor 110 is also connected to the bases of the transistors 88 and 106.

In order to describe the operation of the ring counter constituting this invention, the operation of the transistors such as the transistors 18 and 20 and of the flip-flops such as the flip-flops 10 and 12 must first be understood. The operation of the transistors such as the transistor 18 results from excesses of charges in the various elements of the transistor. For example, in a PNP type of transistor such as a surface barrier transistor, excesses of positive charges or "holes" exist in the emitter and the collector of the transistor and excesses of electrons exist in the base of the transistor.

When a negative voltage is applied to the base of a PNP type of transistor relative to the potential on the emitter, the positive charges in the emitter are attracted toward the base. If a sufficient acceleration is imparted to the positive charges by the voltage between the base and emitter of the transistor, the positive charges continue their movement past the base to the collector of the transistor. This is especially true when a negative voltage is applied to the collector of the transistor so that the collector will exert a further attractive force on the positive charges traveling from the emitter.

The transistors in each flip-flop are cross connected so that one of the transistors is conductive and the other transistor is cut off at any instant. For example, when a negative voltage is introduced to the base of the transistor 18, the transistor becomes conductive. This causes current to flow through a circuit including the resistance 22, the emitter and collector of the transistor 18, the resistance 24 and the voltage source 26 when the switch 27 is closed. The flow of current through the transistor 18 causes a relatively low impedance to be produced between the emitter and collector of the transistor relative to the value of the resistance 24. Because of this difference in impedances, a voltage approaching ground potential is produced on the collector of the transistor 18.

The ground potential on the collector of the transistor 18 is introduced to the base of the transistor 20. Since no voltage difference is produced between the base and emitter of the transistor 20, the transistor becomes non-conductive. This prevents current from flowing through a circuit including the resistance 22, the transistor 20, the resistance 28 and the voltage source 26. By preventing current from flowing through this circuit, a negative voltage is produced on the collector of the transistor 20. This negative voltage is introduced to the base of the transistor 18 to maintain the flow of current through the transistor.

The transistor 18 remains conductive and the transistor 20 remains non-conductive until the introduction of a negative signal to the base of the transistor 20. This signal makes the transistor 20 conductive and produces a flow of current through a circuit including the resistance 22, the transistor 20, the resistance 28 and the voltage source 26. Because of the low impedance produced in the transistor 20, a voltage approaching ground potential is produced on the collector of the transistor 20 when current flows through the transistor.

The ground potential on the collector of the transistor 20 is introduced to the base of the transistor 18 to cut off the transistor 18. Since the transistor 18 becomes cut off, current is not able to flow through a circuit including the resistance 22, the transistor 18, the resistance 24 and the voltage source 26. This causes a negative voltage to be produced on the collector of the transistor 18. This negative voltage is introduced to the base of the transistor 20 to maintain a flow of current through the transistor.

The flip-flop formed in part by the transistors 18 and 20 is described in detail in co-pending application, Serial Number 565,093, filed February 13, 1956, by Frank A. Hill et al. As described in the co-pending application, the inclusion of the resistance 22 in the flip-flop has certain advantages. These result in part from the fact that current always flows through the resistance 22 to produce a negative potential on the emitters of the transistors 18 and 20. Current always flows through the resistance 22 since one of the transistors 18 and 20 is conductive at all times.

Since a negative voltage is produced on the emitters of the transistors 18 and 20, the voltages on the bases of the transistors do not have to travel as close to ground in order to make the transistors conductive. Because of this, the collectors of the transistors 30 and 33 and of the transistor 38 can have a negative voltage with increased magnitude. Negative voltages with increased magnitudes are produced on the collectors of the transistors 30, 33 and 38 by decreasing the amplitudes of the currents flowing through the transistors. Since the currents through the transistors 30, 33 and 38 can be reduced, the amplitudes of the signals applied to the bases of the transistors can be correspondingly reduced. In this way, the requirements as to the signals for triggering the flip-flops such as the flip-flop 10 can be lowered.

Because of the negative potential produced across the resistance 22, a negative potential of increased magnitude is produced on the collectors of the transistors 18 and 20 when current does not flow through the transistors. This results from the fact that the collectors of the transistors 18 and 20 become negative with respect to the emitters when current does not flow through the transistors. By producing a negative potential of increased magnitude on the collectors of the transistors 18 and 20, increased flows of current are obtained through the stages controlled by the transistors. As described in detail in co-pending application, Serial Number 565,093, the increased currents through the stages controlled by the transistors 18 and 20 are considerably greater than might ordinarily be expected. This results from the operating characteristics of the transistors in these stages. Because of the increased flow of current through the stages controlled by the transistors 18 and 20, a positive control over the operation of these stages and the successive stages is insured.

The transistors 94 and 100 are included in one flip-flop in Figure 2, and the transistors 106 and 110 are included in another flip-flop. The operation of these flip-flops is controlled by the signals from the clock generator 80. These signals are produced on a recurrent basis, preferably at a particular frequency. The signals preferably have rectangular characteristics, as indicated at 130 in Figure 3 for the positive portions of the signals and at 132 for the negative portions of the signals. The signals may be obtained from the clock generator of a digital computer or may be obtained in any other suitable manner.

Figure 3:
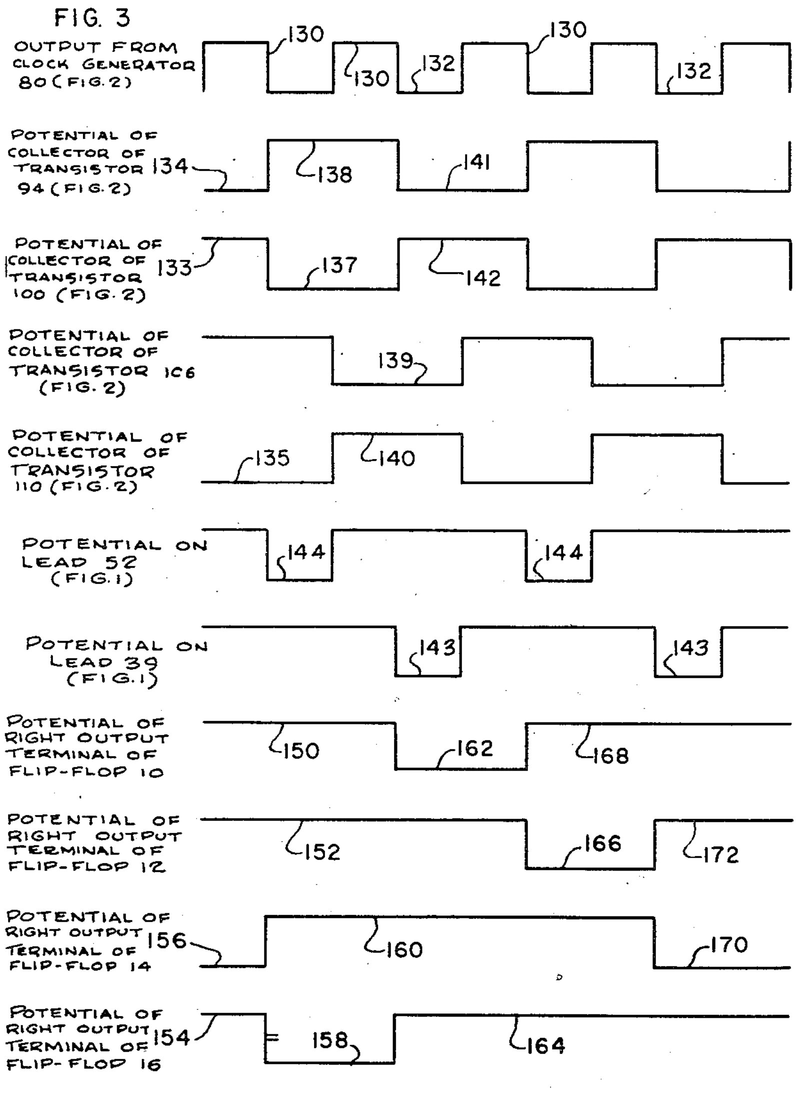
Figure 3 shows a plurality of curves illustrating the wave-forms of various voltages at strategic terminals in the circuitry shown in Figures 1 and 2.

The clock generator 80 may be initially operating in a state represented by one of the positive signal portions 130. This signal is introduced to the base of the transistor 82 to interrupt any flow of current through the transistor. For purposes of discussion, it will be considered that the transistor 100 is conductive at this time. Since the transistor 100 is conductive, a potential approaching ground is produced on the collector of the transistor, as indicated at 133 in Figure 3. This ground potential is introduced to the base of the transistor 94 to cut off the transistor 94 for the production of a negative voltage on the collector of the transistor, as indicated at 134 in Figure 3. It will also be considered that the transistor 106 is initially conductive and the transistor 110 is initially non-conductive. Because of the initial state of non-conductivity of the transistor 110, a negative potential indicated at 135 in Figure 3 is produced on the collector of the transistor.

Upon the occurrence of the first signal portion 132 of negative polarity, the transistor 82 becomes conductive. When the transistor 82 becomes conductive, a potential approaching ground is produced on the collector of the transistor 82 for introduction to the emitters of the transistors 86 and 88. This causes the transistor 88 to become conductive since a negative potential is simultaneously introduced to the base of the transistor 88 from the collector of the transistor 110. When the transistor 88 becomes conductive, a ground potential is produced on the collector of the transistor and is introduced to the base of the transistor 100.

The ground potential on the collector of the transistor 88 causes the transistor 100 to become cut off such that a negative potential indicated at 137 is produced on the collector of the transistor. This negative potential is introduced to the base of the transistor 94 to make the transistor conductive. By producing a flow of current through the transistor 94, a potential approaching ground is produced on the collector of the transistor, as indicated at 138 in Figure 3.

In the next half cycle of the clock signals from the generator 80, one of the signal portions 130 having a ground potential is introduced to the emitters of the transistors 90 and 92. This causes the transistor 90 to become conductive since a negative potential is simultaneously introduced to the transistor from the collector of the transistor 100. When the transistor 90 becomes conductive, a ground potential is produced on the collector of the transistor for introduction to the base of the transistor 106. This ground potential makes the transistor 106 non-conductive such that a negative potential is produced on the collector of the transistor, as indicated at 139 in Figure 3. Because of the inclusion of the transistors 106 and 110 in a flip-flop, the transistor 110 becomes conductive when the transistor 106 becomes non-conductive. By making the transistor 110 conductive, a potential approaching ground is produced on the collector of the transistor as indicated at 140 in Figure 3.

A signal portion 132 having a negative polarity is produced in the next half cycle of voltage from the clock generator 80. This signal portion makes the transistor 82 conductive and causes a potential approaching ground to be produced on the collector of the transistor for introduction to the emitters of the transistors 86 and 88. Because of this ground potential, the transistor 86 becomes conductive since a negative potential is simultaneously introduced to the base of the transistor from the collector of the transistor 106.

By making the transistor 86 conductive, a potential approaching ground is produced on the collector of the transistor for introduction to the base of the transistor 94. This potential causes the transistor 94 to become cut off for the production of a negative voltage on the collector of the transistor, as indicated at 141 in Figure 3. The transistor 100 becomes conductive at the same instant to produce a potential approaching ground on the collector of the transistor, as indicated at 142 in Figure 3.

It will be seen from the above discussion that the transistors 94 and 100 change their states of operation every time that one of the signal portions 132 is produced. Upon the occurrence of alternate signal portions 132, the transistor 100 becomes cut off and the transistor 94 becomes conductive. In the other signal portions 132, the transistor 94 becomes cut off and the transistor 100 becomes conductive. In this way, the transistors 94 and 100 return to their initial states of operation at the end of every two clock signals from the generator 80.

The transistor 98 can become conductive only during the time that a negative potential is produced on the collector of the transistor 94. As described in the previous paragraph, a negative potential is produced on the collector of the transistor 94 for only a half cycle in every two cycles. When this negative potential coincides with a ground potential on the collector of the transistor 82, the transistor 98 becomse conductive to produce a ground potential on the collector of the transistor. This ground potential is inverted by the transistor 99 so as to pass to the line 39 in Figures 1 and 2 negative signals indicated at 143 in Figure 3. In like manner, negative signals indicated at 144 in Figure 3 are introduced to the line 52 in Figures 1 and 2.

In order to place the ring counter shown in Figure 1 properly into operation, a clearing signal must initially be introduced to the different flip-flops in the counter. This clearing signal is produced when the master switch 27 is initially closed to set the counter into operation. When the switch 27 is manually closed, a surge of current flows from the voltage source 26 through the switch and the capacitance 37 to charge the capacitance. The signal produced by this flow of current is further sharpened by the differentiator 36 to produce a triggering signal. The triggering signal may be inverted to obtain a signal with a negative polarity.

The negative signal from the inverter 35 is introduced to the right input terminal of the monostable multivibrator 34. This signal triggers the right transistor in the multivibrator into a state of conductivity and the left transistor in the flip-flop into a state of non-conductivity. Because of this, a voltage of negative polarity is produced on the left output terminal of the multivibrator 34.

The voltage of negative polarity continues on the left output terminal of the multivibrator 34 for a period of time substantially equal to one cycle of the clock signals from the generator 80 in Figure 2. At the end of this period of time, the multivibrator 34 automatically returns to its normal condition in which a ground potential is produced on the left output terminal of the flip-flop and a potential of negative polarity is produced on the right output terminal of the flip-flop. The multivibrator 34 may be constructed in a manner similar to that described in detail in co-pending application, Serial Number 564,993, filed February 13, 1956, by Frank A. Hill et al.

The voltage of negative polarity on the left output terminal of the multivibrator 34 is introduced to the base of the transistor 33 to produce a flow of current through the transistor. This causes a potential approaching ground to be produced on the collector of the transistor 33. The ground potential on the collector of the transistor 33 is introduced to the base of the transistor 18 to cut off any flow of current through the transistor. Since the transistor 20 is included with the transistor 18 in the flip-flop 10, the transistor 20 becomes conductive when the transistor 18 becomes non-conductive. This has been described in detail previously. By making the transistor 20 conductive, a potential approaching ground is produced on the collector of the transistor, as indicated at 150 in Figure 3.

In like manner, the voltage of negative polarity on the left output terminal of the multivibrator 34 is introduced to the base of the transistor 47 to make the transistor conductive. This causes the transistor 42 in the flip-flop 12 to become cut off and the transistor 32 in the flip-flop to become conductive. By making the transistor 32 in the flip-flop 12 conductive, a potential approaching ground is produced on the collector of the transistor, as indicated at 152 in Figure 3.

The voltage of negative polarity from the multivibrator 34 is also introduced to the base of the transistor 65 to make the transistor conductive. This causes a potential of negative polarity to be produced on the left output terminal of the flip-flop 16 and a ground potential to be produced on the right output terminal of the flip-flop. The ground potential produced on the right output terminal of the flip-flop 16 is indicated at 154 in Figure 3.

The voltage of negative polarity from the multivibrator 34 is also introduced to the base of the transistor 63 to make the transistor conductive. By making the transistor 63 conductive, a potential approaching ground is produced on the collector of the transistor. This potential is introduced to the emitter of the transistor 60 to produce a flow of current through the transistor when a negative voltage is introduced to the base of the transistor. This occurs upon the generation of the next triggering signal 143 by the signal generator 40 for introduction to the line 39.

The next triggering signal 143 coincides with the clearing signal from the monostable multivibrator 34 because of the characteristics provided for the multivibrator. These characteristics cause the clearing signal to be produced by the multivibrator 34 for a period of time substantially equal to the time between two successive triggering pulses 143. In this way, the clearing signal from the multivibrator 34 must coincide with one of the triggering signals 143 but cannot coincide with two of the triggering signals. This is important in insuring that the flip-flops in the ring counter can be set only once to their initial state of operation every time that a count is initiated by the closure of the switch 27.

When the transistor 60 becomes conductive upon the occurrence of the clearing signal from the multivibrator 34, the voltage on the collector of the transistor approaches the ground potential on the emitter of the transistor. This causes the right transistor in the flip-flop 14 to become cut off and the left transistor in the flip-flop to become conductive in a manner similar to that described above. As will be seen, the flip-flop 14 is triggered by the clearing signal from the multivibrator 34 in a pattern opposite to that of the flip-flops 10, 12 and 16 in the ring counter. Because of this, the count of the triggering signals 143 and 144 is initiated from the flip-flop 14.

Since the right transistor in the flip-flop 14 is cut off, a voltage of negative polarity is produced on the right output terminal of the flip-flop. The voltage of negative polarity is indicated at 156 in Figure 3. This voltage is introduced to the base of the transistor 68 to make the transistor conductive. By making the transistor 68 conductive, a potential approaching ground is produced on the collector of the transistor. This potential is introduced to the emitter of the transistor 66.

Upon the introduction of the next triggering signal 144, the transistor 66 becomes conductive since a negative potential is then applied to the base of the transistor at the time that a ground potential is applied to the emitter. One of the triggering signals 144 is the first signal to be produced after the clearing of all of the flip-flops 10, 12, 14 and 16 because of the operation of the immediately preceding signal 143 in clearing the flip-flop 14. By making the transistor 66 conductive, a ground potential is produced on the collector of the transistor for introduction to the right input terminal in the flip-flop 16.

The ground potential introduced to the right input terminal of the flip-flop 16 triggers the flip-flop 16 so as to cut off the right transistor in the flip-flop and to make the left transistor conductive. By cutting off the right transistor in the flip-flop 16, a voltage of negative polarity is produced on the right output terminal of the flip-flop, as indicated at 158 in Figure 3. The triggering of the flip-flop 16 in this manner can be logically expressed as $$n_4 = N_3 B \qquad (1)$$

where $n_4$=a triggering signal introduced to the right input terminal of the flip-flop 16;

$N_3$=a voltage of negative polarity on the right output terminal of the flip-flop 14 to represent a state of nonconductivity in the right transistor of the flip-flop; and $B$=one of the triggering signals 144 passing through the line 52 from the signal generator 40 in Figure 1.

By cutting off the right transistor in the flip-flop 16, a voltage of negative polarity is produced on the right output terminal of the flip-flop. This voltage is introduced to the base of the transistor 58 to make the transistor conductive. When the transistor 58 becomes conductive, it causes a potential approaching ground to be produced on the collector of the transistor. This potential acts to cut off the left transistor in the flip-flop 14 and to make the right transistor in the flip-flop conductive. Since the right transistor in the flip-flop 14 is conductive, a potential approaching ground is produced on the right output terminal of the flip-flop. This potential is indicated at 160 in Figure 3.

In this way, the flip-flop 14 becomes triggered by the flip-flop 16 from its first state of operation to its second state of operation immediately after it acts to trigger the flip-flop 16 to the first state of operation. The triggering of the flip-flop 14 to the second state of operation can be logically expressed as $$\bar{n}_3 = N_4 \qquad (2)$$

where $\bar{n}_3$=the introduction of a triggering signal to the left input terminal of the flip-flop 14; and $N_4$=the production of a voltage of negative polarity on the right output terminal of the flip-flop 16.

The voltage of negative polarity produced on the right output terminal of the flip-flop 16 is also introduced to the base of the transistor 41. This voltage makes the transistor 41 conductive such that a voltage approaching ground is produced on the collector of the transistor. The ground potential on the collector of the transistor 41 is in turn introduced to the emitter of the transistor 38. Upon the occurrence of the next triggering signal 143, a negative potential is introduced to the base of the transistor 38 to make the transistor conductive. The triggering signal 143 is the first signal to occur after the production of a negative voltage on the right output terminal of the flip-flop 16. This results from the fact that the flip-flop 16 was previously triggered by one of the signals 144.

When the transistor 38 becomes conductive, it causes a potential approaching ground to be produced on the collector of the transistor. This potential is introduced to the base of the transistor 20 to cut off any flow of current through the transistor such that a voltage of negative polarity is produced on the collector of the transistor. Since the transistor 20 in the flip-flop 10 becomes cut off, the transistor 18 in the flip-flop becomes conductive. By cutting off the transistor 20 in the flip-flop 10, a potential of negative polarity is produced on the collector of the transistor. This is indicated at 162 in Figure 3.

The triggering of the flip-flop 10 for the production of a negative potential on the collector of the transistor 20 and a ground potential on the collector of the transistor 18 can be logically expressed as $$n_1 = N_4 A \qquad (3)$$

where $n_1$=the introduction of a triggering signal to the base of the transistor 18;

$N_4$=the production of a voltage of negative polarity on the right output terminal of the flip-flop 16; and $A$=one of the triggering signals 143.

The voltage of negative polarity produced on the collector of the transistor 20 is introduced to the base of the transistor 64 to produce a flow of current through the transistor. By making the transistor 64 conductive, a potential approaching ground is produced on the collector of the transistor. This potential is introduced to the left input terminal of the flip-flop 16 to trigger the left transistor in the flip-flop to a state of non-conductivity and the right transistor in the flip-flop to a state of conductivity. Since the right transistor in the flip-flop 16 is a state of conductivity, a potential approaching ground is produced on the right output terminal of the flip-flop, as indicated at 164 in Figure 3.

As previously described, the flip-flop 16 is also triggered upon the introduction of a signal from the left output terminal of the multivibrator 34 to the base of the transistor 65 to produce a ground potential on the right output terminal of the flip-flop. For this reason, the introduction of triggering signals to the left input terminal of the flip-flop 16 can be expressed by the following logical equation:

$$\bar{n}_4 = N_1 + I \qquad (4)$$

$\bar{n}_4$=the introduction of a triggering signal to the left input terminal of the flip-flop 16;

$N_1$=the production of a voltage of negative polarity on the collector of the transistor 20;

$I$=the production of a voltage of negative polarity on the left output terminal of the multivibrator 34; and $+$=an "or" proposition in which $\bar{n}_4$ becomes true when either N or I is true.

In addition to being introduced to the base of the transistor 64, the voltage of negative polarity on the collector of the transistor 20 is also introduced to the base of the transistor 54. This voltage causes the transistor 54 to become conductive such that a potential approaching ground is produced on the collector of the transistor. The ground potential is introduced to the emitter of the transistor 50 to make the transistor conductive when a negative potential is introduced to the base of the transistor.

The transistor 50 becomes conductive upon the occurrence of the next triggering signal 144. This is the first triggering signal to occur after the production of a negative voltage on the collector of the transistor 20 since the operation of the flip-flop 10 is controlled by the triggering signals 143. When the transistor 50 becomes conductive, a potential approaching ground is produced on the collector of the transistor for introduction to the base of the transistor 32. This causes the transistor 32 in the flip-flop 12 to become cut off and the transistor 42 in the flip-flop to become conductive.

When the transistor 32 in the flip-flop 12 becomes cut off, the voltage on the collector of the transistor 32 changes from a potential approaching ground to a negative polarity. The voltage of negative polarity is indicated at 166 in Figure 3. The production of a voltage of negative polarity on the collector of the transistor 32 can be expressed by the following logical equation:

$$n_2 = N_1 B \qquad (5)$$

where $n_2$=the introduction of a triggering signal to the base of the transistor 32 in the flip-flop 12;

$N_1$=the production of a voltage of negative polarity on the collector of the transistor 20 in the flip-flop 10;

$B$=the occurrence of one of the triggering signals 144.

The voltage of negative polarity produced on the collector of the transistor 32 is introduced to the base of the transistor 30 to produce a flow of current through the transistor 30. The flow of current through the transistor 30 causes a potential approaching ground to be produced on the collector of the transistor. This potential is introduced to the base of the transistor 18 to cut off the flow of current through the transistor. Since the transistor 18 in the flip-flop 10 becomes cut off, the transistor 20 in the flip-flop becomes conductive. Because of this, the potential on the collector of the transistor 20 changes from a negative value to a value approaching ground as indicated at 168 in Figure 3.

It will be seen from the previous discussion that the transistor 18 in the flip-flop 10 becomes triggered to a state of non-conductivity when a clearance signal is initially produced by the multivibrator 34. The transistor 18 is also triggered to a state of non-conductivity when a voltage of negative polarity is produced on the collector of the transistor 32. For these reasons, the introduction of triggering signals to the transistor 18 can be expressed by the following relationship:

$$\bar{n}_1 = N_2 + I \qquad (6)$$

where $\bar{n}_1$=the introduction of a triggering signal to the base of the transistor 18;

$N_2$=the production of a voltage of negative polarity on the collector of the transistor 32;

$I$=the production of a voltage of negative polarity on the left output terminal of the multivibrator 34; and $+$=an "or" proposition in which either N or I can be true.

The voltage of negative polarity on the collector of the transistor 32 is introduced to the base of the transistor 62 as well as to the base of the transistor 30. This voltage causes the transistor 62 to become conductive and a potential approaching ground to be produced on the collector of the transistor. The emitter of the transistor 60 receives the ground potential on the collector of the transistor 62 and biases the transistor 60 for a flow of current through the transistor when a negative potential is introduced to the base of the transistor.

The transistor 60 becomes conductive when the next triggering signal 143 is produced. This is the first one of the triggering signals 143 and 144 to be produced after the production of a voltage of negative polarity on the collector of the transistor 32. The reason is that the triggering of the transistor 32 to a state of non-conductivity is dependent upon the occurrence of one of the triggering signals 144.

When the transistor 60 becomes conductive, a potential approaching ground is produced on the collector of the transistor. This potential causes the right transistor in the flip-flop 14 to become cut off such that a voltage of negative polarity is produced on the right output terminal of the flip-flop. This negative voltage is indicated at 170 in Figure 3. At the same time that the right transistor in the flip-flop 14 becomes cut off, the left transistor in the flip-flop becomes conductive.

The triggering of the flip-flop 14 to produce a voltage of negative polarity on the right output terminal of the flip-flop can be logically expressed as $$n_3 = (N_2 + I)A \qquad (7)$$

where $n_3$=the introduction of a triggering signal to the right input terminal of the flip-flop 14;

$N_2$=the production of a voltage of negative polarity on the collector of the transistor 32 in the flip-flop 12;

$I$=the production of a voltage of negative polarity on the left output terminal of the multivibrator 34; and $A$=the occurrence of one of the triggering signals 143.

Upon the production of a voltage of negative polarity on the right output terminal of the flip-flop 14, the transistor 48 becomes conductive. This causes a potential approaching ground to be produced on the collector of the transistor 48 for introduction to the base of the transistor 42. This triggers the transistor 42 into a state of non-conductivity and makes the transistor 32 conductive. By making the transistor 32 conductive, the potential on the collector of the transistor changes from a negative value to a value approaching ground. This is indicated at 172 in Figure 3. The logical equation for triggering the flip-flop 12 for the production of a ground potential on the collector of the transistor 42 is $$\bar{n}_2 = N_3 + I \qquad (8)$$

where $\bar{n}_2$=the introduction of a triggering signal to the base of the transistor 42; and the other terms have previously been defined.

It will be seen from the above discussion and from the logic expressed in Equations 1 to 8, inclusive, that the flip-flops 10, 12, 14 and 16 follow a definite pattern of operation. The flip-flops 10, 12, 14 and 16 become sequentially triggered to first states of operation upon the occurrence of successive triggering signals 143 and 144.

This may be best seen in Figure 3. The triggering of each of the flip-flops 10, 12, 14 and 16 to its first state of operation is obtained after the preceding flip-flop has been triggered to its first state of operation and upon the introduction of the next one of the triggering signals 143 and 144.

Each of the flip-flops 10, 12, 14 and 16 subsequently becomes triggered to its second state of operation when the next flip-flop in the ring becomes triggered to its first state of operation. The triggering of the flip-flops 10, 12, 14 and 16 as described above is facilitated by the production of the signals 143 and 144 on an alternate basis and by the introduction of the signals 143 to alternate flip-flops in the ring and the signals 144 to the other flip-flops in the ring.

It should be appreciated that four flip-flops are included in the ring only by way of illustration and that any number of flip-flops may actually be included in the ring. It is believed that a person skilled in the art would be able to understand from the above discussion, from the logical equations and from the drawings how to construct the ring counter with a different number of flip-flops.

It should also be appreciated that the flip-flops do not have to be constructed in a manner similar to that described above and shown in the drawings for the flip-flops 10 and 12. Actually, different types of flip-flops can be used. However, it is believed that there are certain advantages in the use of flip-flops formed from a pair of directly coupled transistors having a resistance connected between the emitters of the transistors and ground.

The characteristics of the triggering sgnals 143 and 144 are also shown only by way of illustration. The triggering signals 143 and 144 can occur at any desired frequency and can have any desired time duration. For example, it may be desirable to have the signals 143 produced for half of the time and the signals 144 produced for the other half of the time. In this way, one of the triggering signals is being produced at all times. By producing the signals in this manner, optimum assurance is provided that proper operation will be obtained in the stages controlled by the triggering signals. Because of this, it will be seen that the circuit shown in Figure 2 is only illustrative and that other circuits can also be used.

The circuitry for producing the clearing signal for introduction to the different flip-flops is also shown and described only by way of illustration. Actually, a number of different types of circuits can be used for producing the clearing signals.

We claim:

1. A ring counter, including, a plurality of bistable members each having first and second states of operation, means for providing first and second triggering signals and for introducing the first signals to alternate bistable members and the second signals to the other bistable members, means for introducing to each bistable member signals from the preceding bistable member to obtain the triggering of the bistable member to its first state of operation in synchronism with the introduction of the triggering signals to the bistable member upon the occurrence of the first state of operation in the preceding bistable member, and means for introducing to each bistable member signals from the next bistable member in the plurality to return each bistable member to its second state of operation upon the triggering of the next bistable member to its first state of operation.

2. A ring counter, including, a plurality of bistable members each having first and second states of operation, means for introducing signals from each bistable member to the next bistable member in the plurality to obtain the triggering of the next bistable member into its first state of operation only upon the occurrence of a particular state of operation in the first bistable member, means for introducing first signals to alternate bistable members in the plurality and second signals to the other bistable members in the plurality on an alternate basis with the first signals to control the times at which the bistable members are triggered into their first states of operation, and means for introducing signals from each bistable member to the preceding bistable member in the plurality to trigger the preceding bistable member into its second state of operation upon the triggering of the first bistable member.

3. A ring counter including, a plurality of bistable members having first and second states of operation, means for providing first and second triggering signals on an alternate basis, means for introducing the first triggering signals to alternate bistable members in the plurality and for introducing the second triggering signals to the other bistable members in the plurality, means for introducing voltages to each bistable member from the preceding bistable member in the plurality to produce the first state of operation of the bistable member upon the occurrence of first states of operation of the preceding bistable member and the simultaneous introduction of one of the triggering signals, and means for introducing voltages to each bistable member in the plurality to produce the second state of operation of the bistable member upon the occurrence of the first state of operation of the next bistable member.

4. A ring counter, including, a plurality of bistable members each having first and second stages intercoupled to provide for a first state of operation of one of the stages and a second state of operation of the other stage at any one time, means for providing first and second triggering signals on an alternate basis and for introducing the first triggering signals to the first stages of alternate bistable members in the plurality and for introducing the second triggering signals to the first stages of the other bistable members in the plurality, means for providing for the passage of the triggering signals to the first stages of each bistable member upon the occurrence of first states of operation in the first stage of the preceding bistable member in the plurality to provide for the triggering of the first stage in each bistable member to the first state of operation, and means for triggering the second stage of each bistable member to the first state of operation upon the occurrence of the first state of operation in the first stage of the next bistable member in the plurality.

5. A ring counter, including, a plurality of bistable members each including first and second semi-conductors electrically associated with each other to provide a first state of operation upon a flow of current through the first semi-conductor and to provide a second state of operation upon a flow of current through the second semi-conductor, means for providing first and second triggering signals on an alternate basis and for providing for the introduction of the first signals to the first semi-conductors in alternate bistable members in the plurality and for providing for the introduction of the second signals to the first semi-conductors of the other bistable members in the plurality, means for introducing to the first semi-conductor of each bistable member a particular one of the triggering signals in response to a particular voltage from the first semi-conductor of the preceding bistable member in the plurality to provide for the second state of operation in each bistable member only upon the occurrence of the second state of operation in the preceding bistable member and the simultaneous introduction of one of the triggering signals, and means for introducing to the second semi-conductor of each bistable member a voltage from the first semi-conductor of the next bistable member in the plurality to provide for the first state of operation in each bistable member upon the occurrence of the second state of operation in the next bistable member.

6. A ring counter, including, a plurality of bistable members each having first and second states of operation, means for providing first triggering signals and for providing second triggering signals alternately with the first triggering signals and for introducing the first triggering signals to alternate bistable members in the plurality and for introducing the second triggering signals to the other bistable members in the plurality, a plurality of "and" networks each coupled to a corresponding one of the bistable members and each operative to pass the triggering signals to its associated bistable member in the plurality upon the occurrence of a first state of operation of the preceding bistable member in the plurality to produce the first state of operation in the associated bistable member, and means for triggering each bistable member back to its second state of operation upon the occurrence of the first state of operation in the next bistable member in the plurality.

7. A ring counter, including, a plurality of bistable members each formed in part from first and second semi-conductors interconnected to provide at any time a first state of operation of one of the semi-conductors and a second state of operation of the other semi-conductor, means for providing for the production of first and second triggering signals on an alternating basis and for introducing the first signals to the first semi-conductors in alternate bistable members and for introducing the second signals to the first semi-conductors in the other bistable members, means for combining the triggering signals introduced to each bistable member and the voltage from the first semi-conductor of the preceding bistable member in the plurality to produce a first state of operation of the first semi-conductor in the bistable member upon the occurrence of a first state of operation in the first semi-conductor of the preceding bistable member, and means for returning each bistable member to the first state of operation of the second semi-conductor in the bistable member upon the occurrence of a first state of operation of the first semi-conductor in the next bistable member.

8. A ring counter, including, a plurality of bistable members each having first and second stages to provide for a first state of operation of one of the stages and a second state of operation of the other stage at any one time, means for alternately providing first and second triggering signals and for introducing the first triggering signals to the first stages of alternate bistable member and for introducing the second triggering signals to the first stages of the other bistable members, means for initially triggering the second stages of the bistable members to their first states of operation and upon the occurrence of a particular one of the triggering signals for triggering the first stage of a particular one of the bistable members to the first state of operation, means for triggering the first stage of each bistable member to its first state of operation upon the occurrence of a first state of operation in the first stage of the preceding bistable member and in synchronization with the introduction of the triggering signals to the first stage of the bistable member, and means for triggering the second stage of each bistable member to its first state upon the occurrence of a first state of operation in the first stage of the next bistable member.

9. A ring counter, including, a plurality of bistable members each having first and second states of operation, means for initially setting the bistable members to their second states of operation and for initially setting a particular one of the bistable members to its first state of operation, means for alternately providing first and second triggering signals and for introducing the first signals to alternate bistable members and for introducing the second signals to the other bistable members, means for introducing to each bistable member signals from the preceding bistable member to provide for the sequential triggering of successive ones of the bistable members to their first states of operation from the particular bistable member as a starting position upon the occurrence of successive triggering signals, and means for triggering each bistable member to its second state of operation upon the triggering of the next succeeding bistable member to its first state of operation.

References Cited in the file of this patent

UNITED STATES PATENTS

| | | |
|---|---|---|
| 2,540,442 | Grosdoff | Feb. 6, 1951 |
| 2,566,918 | Bergfors | Sept. 4, 1951 |
| 2,580,771 | Harper | Jan. 1, 1952 |

FOREIGN PATENTS

| | | |
|---|---|---|
| 1,096,793 | France | Feb. 2, 1955 |

OTHER REFERENCES

Publication (1), Directly Coupled Transistor Circuits by Beter et al. in Electronics, June 1955, pp. 132 to 136.